(12) United States Patent
Hyypio et al.

(10) Patent No.: US 9,484,850 B2
(45) Date of Patent: Nov. 1, 2016

(54) VOLTAGE REGULATOR AND METHODS FOR SIMULATING REACTIVE POWER IN PARALLEL POWER GENERATION SYSTEMS

(71) Applicant: Regal Beloit America, Inc., Beloit, WI (US)

(72) Inventors: David Bruce Hyypio, Schofield, WI (US); Myron Roman Mychal, Schofield, WI (US)

(73) Assignee: Regal Beloit America, Inc., Beloit, WI (US)

( * ) Notice: Subject to any disclaimer, the term of this patent is extended or adjusted under 35 U.S.C. 154(b) by 996 days.

(21) Appl. No.: 13/655,137

(22) Filed: Oct. 18, 2012

(65) Prior Publication Data

US 2014/0111167 A1    Apr. 24, 2014

(51) Int. Cl.

| | |
|---|---|
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |
| H02J 1/10 | (2006.01) |
| H02J 1/00 | (2006.01) |
| H02J 3/00 | (2006.01) |
| H02P 9/14 | (2006.01) |
| H02J 3/16 | (2006.01) |
| H02J 3/18 | (2006.01) |

(52) U.S. Cl.
CPC . *H02P 9/14* (2013.01); *H02J 3/16* (2013.01); *H02J 3/18* (2013.01); *Y02E 40/30* (2013.01); *Y02E 40/74* (2013.01); *Y04S 10/22* (2013.01)

(58) Field of Classification Search
CPC .............. H02P 9/14; H02J 3/16; H02J 3/18; Y02E 40/74; Y02E 40/30; Y04S 10/22
USPC ................................ 700/298; 307/43, 57, 84
See application file for complete search history.

(56) References Cited

U.S. PATENT DOCUMENTS

| | | | | |
|---|---|---|---|---|
| 4,410,848 | A * | 10/1983 | Frierdich | H02P 9/107 322/25 |
| 5,294,879 | A * | 3/1994 | Freeman | H02P 9/302 322/23 |
| 6,218,813 | B1 | 4/2001 | Davis | |
| 6,285,168 | B1 | 9/2001 | Davis | |
| 6,522,030 | B1 * | 2/2003 | Wall | H02J 3/46 307/43 |
| 7,454,637 | B2 * | 11/2008 | Er | G06F 1/26 257/691 |
| 7,933,101 | B2 | 4/2011 | Bourgeau et al. | |
| 8,710,815 | B2 * | 4/2014 | Feng | H02M 3/156 323/271 |

(Continued)

OTHER PUBLICATIONS

A Voltage and Frequency Droop Control Method for Parallel Inverters; Karel De Bradandere et al; IEEE Transactions on Power Electronics, vol. 22, No. 4, Jul. 2007; 9 pages.*

(Continued)

*Primary Examiner* — Ronald Hartman, Jr.
(74) *Attorney, Agent, or Firm* — Armstrong Teasdale LLP

(57) ABSTRACT

Systems, methods, and a voltage regulator are provided for tuning reactive droop compensation of a generator in a parallel power generation system. The voltage regulator is configured to compute a simulated droop compensation voltage for the generator and control an excitation signal to the generator based at least in part on the simulated droop compensation voltage.

20 Claims, 3 Drawing Sheets

(56) References Cited

U.S. PATENT DOCUMENTS

| | | | |
|---|---|---|---|
| 2007/0055896 A1* | 3/2007 | Er | G06F 1/26 713/300 |
| 2013/0073109 A1* | 3/2013 | Cheng | H02J 3/40 700/298 |

OTHER PUBLICATIONS

An Improved Design of Virtual Output Impedance Loop for Droop-Controlled Parallel Three-Phase Voltage Source Inverters; by Xiongfei Wang et al; IEEE copyright 2012; 8 pages.*

An Experimental Study of Frequency Droop Control in a Low-Inertia Microgrid; by Andrew Mark Bollman; Thesis for University of Illinois at Urbana-Champaign; 2009; 60 pages.*

Secondary Control for Reactive Power Sharing in Droop-Controlled Islanded MicroGrids; A. Micallef et al.; IEEE copyright 2012; 7 pages.*

An Accurate Reactive Power Sharing Control Strategy for DG Units in a Microgrid; He et al; 8th International Conference on Power Electronics—ECCE Asia May 30-Jun. 3, 2011, The Shilla Jeju, Korea; 6 pages.*

Paralleling Dissimilar Generators: Part 3—Load Sharing Compatibility; by Gary Olson; Cummins Power Generation; White Paper copyright 2010; 6 pages.*

A Voltage and Frequency Droop Control Method for Parallel Inverters; Brabandere et al; IEEE Transactions on Power Electronics, vol. 22, No. 4, Jul. 2007; 9 pages.*

* cited by examiner

US 9,484,850 B2

VOLTAGE REGULATOR AND METHODS FOR SIMULATING REACTIVE POWER IN PARALLEL POWER GENERATION SYSTEMS

BACKGROUND

The embodiments described herein relate generally to parallel power generation systems, and more particularly, to methods and systems for tuning reactive droop compensation of generators in parallel power generation systems.

The need for efficient power at affordable prices is ever increasing in many areas such as, for example, industrial, commercial, and consumer applications. As the need for power increases, so does the need for uninterrupted power. Many industrial applications require twenty four hour a day operation, therefore, loss of power can have severe economic consequences. One way power suppliers provide uninterrupted power is to employ parallel voltage generating systems. By paralleling generators, power can be delivered reliably because one generator can provide power for another when it fails. Such systems share reactive loads proportionally using reactive droop compensation.

Set-up for such parallel generator systems requires adjustment of voltage droop in proportion to a reactive load. Typically, two or more generators are connected in parallel, and a reactive load is applied using an inductive load bank. Load sharing is accomplished by setting the droop characteristic of each generator accordingly. However, set-up normally occurs in the field where reactive load banks are prohibitively expensive and are not normally available to technicians who set up generators in such applications.

BRIEF DESCRIPTION

In one aspect, a voltage regulator is provided for tuning a reactive droop compensation of a generator in a parallel power generation. The voltage regulator is configured to compute a simulated droop compensation voltage for the generator and control an excitation signal to the generator based at least in part on the simulated droop compensation voltage.

In another aspect, a method is provided for tuning a reactive droop compensation of a generator in a parallel power generation system. The method includes applying a resistive load bank to the generator, computing a simulated droop compensation voltage for the generator using a voltage regulator associated with the generator, and controlling an excitation signal to the generator based at least in part on the simulated droop compensation voltage using the voltage regulator.

In yet another aspect, a parallel power generation system is provided. The system includes a first generator configured to produce an electrical output to drive a load and a voltage regulator for tuning a reactive droop compensation of the first generator. The voltage regulator is configured to compute a simulated droop compensation voltage for the generator and control an excitation signal to the generator based at least in part on the simulated droop compensation voltage.

DETAILED DESCRIPTION

The embodiments described herein relate to voltage regulators for controlling generators in parallel power generation systems. More specifically, the embodiments relate to a voltage regulator that is configured to simulate a reactive load applied to a parallel power generation system. More particularly, the embodiments described herein facilitate using a voltage regulator associated with a generator to simulate a reactive load for tuning a power factor, voltage droop, and/or other various properties of a parallel generator power generation system. Moreover, the embodiments described herein facilitate reducing costs associated with technician labor and costly reactive load rentals. While the embodiments illustrate a three phase electric generator, the embodiments described herein may be included within generators having any number of phases, including single phase and multiple phase electric generators.

Figure 1:
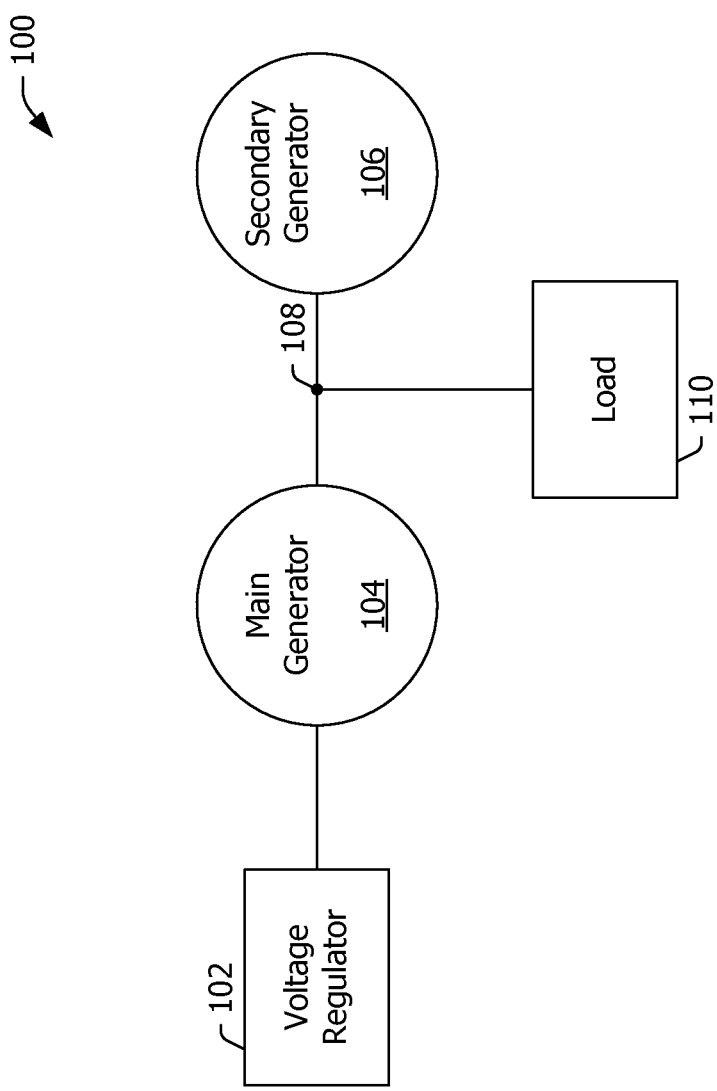
FIG. 1 is a schematic block diagram of a power generation system.

FIG. 1 is a schematic block diagram of a power generation system 100. In the exemplary embodiment, power generation system 100 includes a voltage regulator 102 coupled to a first or main generator 104. Voltage regulator 102 is configured to monitor and control a generator excitation voltage to control the voltage output in main generator 104. In the exemplary embodiment, power generation system 100 further includes at least one secondary generator 106 coupled in parallel to generator 104. Secondary generator 106 includes a separate voltage regulator (not shown) for controlling voltage output of secondary generator 106. Generators 104 and 106 are coupled in parallel when connecting the respective output voltages together at connection point 108. Connection point 108 couples generators 104 and 106 to a load 110.

In the exemplary embodiment, generators 104 and 106 are mechanically-driven to provide an electrical power output. Generators 104 and 106 may be substantially similar and include any type of generator as described herein. Accordingly, for clarity purposes, this discussion will make reference only to main generator 104. In the exemplary embodiment, main generator 104 is an AC generator. Moreover, main generator 104 includes any type of known generator, including but not limited to an AC induction generator, a permanent-magnet generator, an AC synchronous generator, or a switched-reluctance generator. In the exemplary embodiment, main generator 104 is a three-phase AC synchronous generator. More specifically, main generator 104 includes a rotor (not shown) that rotates relative to a stator (not shown). The rotor may include a set of electrical field coils that may be energized by a field excitation current delivered to the field coils. The rotor is rotated by prime mover 106. The stator of main generator 104 includes a set of stationary coils positioned about the rotor such that the rotor may rotate within the stator. As the rotor rotates, an AC current is induced in the stationary coils. This current is directed out of main generator 104 in the form of an AC power signal. The output voltage of main generator 104 may be controlled by controlling a magnitude of the field current applied to the field coils.

During operation, as load 110 increases, main generator 104 delivers more active power to compensate for the change in load 110 by holding the voltage substantially constant, causing an increase in the current. By increasing current, main generator 104 produces more reactive power in the form of reactive volt-amperes (VARs), which raises voltage of system 100. When current in main generator 104 is decreased, system 100 voltage lowers, and VARs are absorbed by main generator 104.

In the exemplary embodiment, generators 104 and 106 are coupled in parallel to provide back-up voltage capability to provide power if one of generators 104 and 106 were to fail. More specifically, if the field excitation on main generator 104 becomes excessive and causes a circulating current to flow between generators 104 and 106, this current will appear as a lagging power factor (inductive load) to main generator 104 and a leading power factor (capacitive load) to secondary generator 106. Coupling generators 104 and 106 in parallel enables voltage regulator 102 to decrease the field excitation on main generator 104 having the lagging power factor and increase the field excitation on secondary generator 106 having the leading power factor so as to minimize the circulating currents between generators 104 and 106. The aforementioned process may be referred to as reactive droop compensation.

When coupled in parallel, each of generators 104 and 106 is tuned the reactive load sharing properties of system 100. In the exemplary embodiment, voltage regulator 102 includes a simulated reactive load mode for simulating a reactive load on generator 104 such that a technician may tune system 100 to a desired power factor or may tune other properties before applying load 110. More specifically, voltage regulator 102 enables tuning a reactive droop compensation of generator 104 in parallel power generation system 100. Voltage regulator 102 enables a technician to use a purely resistive load for setting a simulated power factor of about from −1 to 1 for the desired load. Simulation of the power factor enables the technician to simulate inductive and/or capacitive loads. A typical resistive load bank (not shown) is applied to main generator 104 and, internally, voltage regulator 102 makes calculations as though the load were a reactive load bank with the power factor inputted by the technician. Moreover, the technician can simulate a final equilibrium point of main generator 104 and can then determine how much main generator 104 should be drooping in voltage. Simulating the final equilibrium may be done using one generator and a load bank, rather than having to actually first couple multiple generators in parallel. Without simulation, if the voltage set point for a generator is wrong, it could trip a breaker or damage equipment because of excessive load demand. Accordingly, voltage regulator 102 provides technicians a safe environment that enables them to evaluate the voltage droop behavior or main generator 104 using simulated reactance before the generators are actually connected to the system. In addition, the simulated mode enables technicians to test droop voltage without having to buy or rent a reactive load bank, which is often unavailable or costly to obtain.

Figure 2:
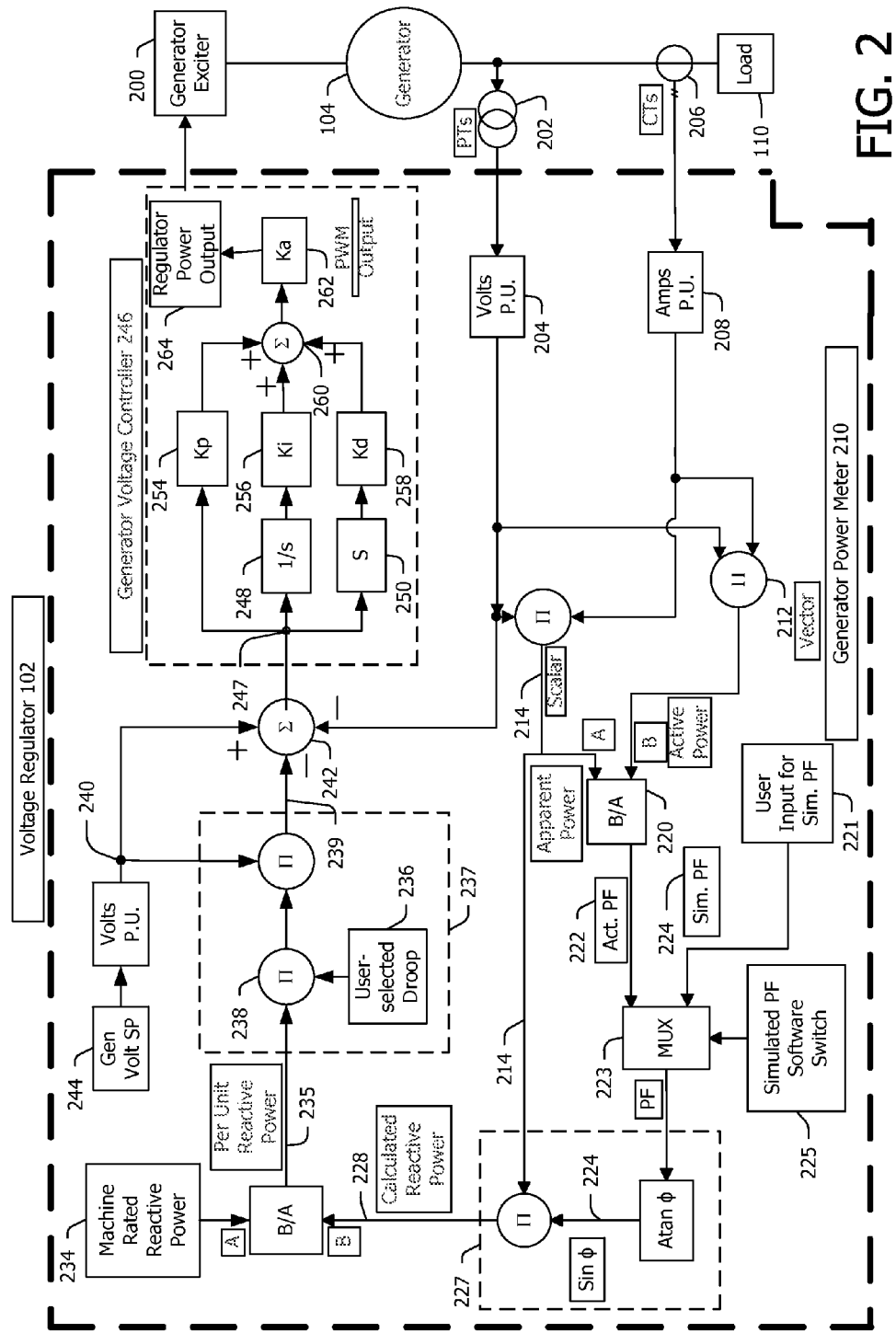
FIG. 2 is a block diagram of a voltage regulator that may be used with the system shown in FIG. 1.

FIG. 2 is a block diagram of voltage regulator 102 (shown in FIG. 1) that may be used with system 100 (shown in FIG. 1). The magnitude of AC voltage at main generator 104 (shown in FIG. 1) is determined by the level of current in a generator exciter 200, which receives an excitation signal from voltage regulator 102 and applies it to main generator 104. The magnitude of main generator 104 AC output voltage may require that potential transformers 202 be used to step down the generator AC voltage to an appropriate level for voltage sensing inputs 204 of voltage regulator 102. Main generator 104 current levels are sensed using current transformers 206. The secondary windings of current transformers 206 are input into current sensing inputs 208 of voltage regulator 102.

In the exemplary embodiment, apparent, real and reactive power are each computed by voltage regulator 102. Voltage regulator 102 computes active real power 212 by vectorially multiplying the current of main generator 104 by the phase voltage of main generator 104. The resulting vector product 212 represents the active power delivered by main generator 104 to resistive load bank 110. Voltage regulator 102 calculates apparent power by a scalar multiplication 214 of the average sensed generator phase voltages 204 and average sensed line currents 208. Determining the ratio 220 of real active power 212 to apparent power 214 provides actual power factor 222 of main generator 104. In one embodiment, actual power factor 222 is calculated using the Pythagorean Theorem by a division function 220, which divides active real power 212 by apparent power 214. In an alternative embodiment, a simulated power factor 224 is instead input into multiplexer 223.

In the exemplary embodiment, to make use of the simulated reactive power mode of voltage regulator 102, in a reactive droop compensation mode, a user may set a software switch 225 for simulating reactive power. Software switch 225 controls a multiplexer 223 that channels either actual power factor 222 or simulated power factor 224, fabricated through a user-defined simulated power factor 221, to be used as an input into a reactive power calculator 227. Reactive power calculator 227 multiplies apparent power 214 by the sine of a power factor angle, which is calculated by an inverse tangent trigonometric function 226. An output of calculated reactive power 228, which is in units of VARs, is converted to a per-unit value 235 based on a user-input value of rated reactive power 234 of generator 104. In the per-unit measurement scheme, a numerical value of one is used to represent rated reactive power of generator 104. The per-unit calculation is performed by a division function 232, which divides calculated reactive power 228 by rated reactive power 234 of generator 104. Per-unit reactive power 235 is input into a droop compensation calculator 237. Within droop compensation calculator 237, a user-selected droop percentage 236 is defined, which represents the droop in the voltage of generator 104 when rated reactive power 234 is being delivered by generator 104. User-selected droop 236 is multiplied by per-unit reactive power 235, which results in the desired per-unit value of generator voltage droop 238. The per-unit value of voltage droop 238 is multiplied by the value of generator per-unit voltage setpoint 240 and the resulting droop compensation signal 239 is obtained.

In the exemplary embodiment, droop compensation output 239 is inputted as a negative value into main generator 104 AC voltage regulator summing junction 242. Summing junction 242 also includes main generator 104 AC voltage set point 244 as an input and the negative feedback value of actual generator AC voltage 204. The output 247 of summing junction 242 represents the error signal of the generator voltage control loop and is inputted into a generator voltage PID controller 246. Generator voltage PID controller 246 acts on output 247 of summing junction 242 by performing a time-based integration function 248 and a time-based derivative function 250. Each of signals 248 and 250, along with unmodified signal 252 is inputted into corresponding gain functions, Kp 254, Ki 256, and Kd 258. These individually adjustable gains may be adjusted to meet the dynamic performance, system stability, and steady-state voltage regulation requirements of system 100. The outputs of gain functions Kp 254, Ki 256, and Kd 258 are summed in a summing junction 260. The output of summing junction 260 is inputted into a gain function 262. The output of gain function 262 is inputted into a power amplification stage 264 that drives the required amount of excitation current into generator exciter field winding 200.

The level of current in exciter field winding 200 determines the level of excitation in the main field of main generator 104. By tuning gains Kp 254, Ki 256, and Kd 258 of generator voltage PID controller 246 and applying the amount of droop percentage 236 needed for reactive load sharing, the desired response of main generator 104 to varying load demands is achieved.

In the exemplary embodiment, to simulate droop compensation, a technician places voltage regulator 102 into the simulated reactive power mode using software switch 225. In the simulated reactive power mode, multiplexer 223 takes its input from simulated power factor 224 to compute a simulated value of calculated reactive power 228. The simulated value of calculated reactive power 228, after processing through per-unit function 232 and the droop compensation calculator 237, results in a droop compensation signal 239 causing a voltage droop in input signal 247 of PID controller 246. PID controller 246 drives the output of the voltage regulator 102 to control the output voltage of generator 104 to match the desired value of PID input signal 247. The magnitude of simulated reactive power is controlled by the actual value of apparent power 214 flowing in resistive load bank 110 and user-defined value of simulated power factor 221. Moreover, voltage regulator 102 controls an excitation signal to the generator based at least in part on the simulated droop compensation voltage. Once the proper droop settings 236 are achieved, software switch 228 is placed back into its normal mode to enable actual power factor 222 to channel through multiplexer 233 to perform droop compensation 227, 232, and 237.

Figure 3:
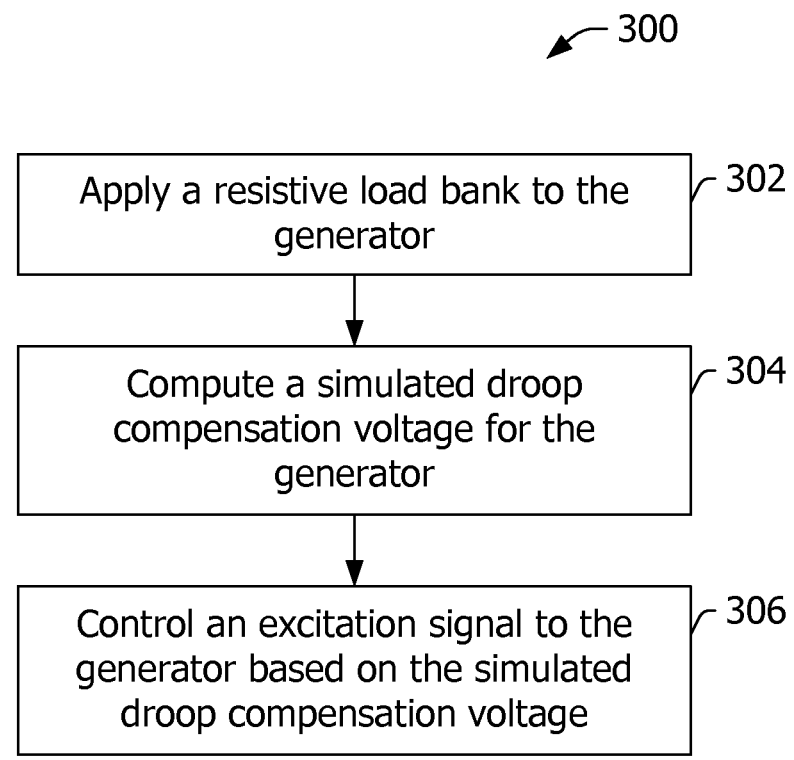
FIG. 3 is a flowchart of an exemplary method of tuning a reactive droop compensation of a generator in the system shown in FIG. 1.

FIG. 3 is a flowchart 300 of an exemplary method of tuning a reactive droop compensation of generator 104 (shown in FIG. 1) in parallel power generation system 100 (shown in FIG. 1). In the exemplary embodiment, the method includes applying 302 a resistive load bank to generator 104.

Once the resistive load bank is applied, the method includes computing 304 a simulated droop compensation voltage for generator 104 using voltage regulator 102 (shown in FIG. 1) associated with generator 104. In the exemplary embodiment, computing the simulated droop compensation voltage includes inputting a desired power factor into voltage regulator 102 and computing reactive power using the desired power factor. Computing the simulated droop compensation voltage further includes computing a ratio of the reactive power and rated machine parameters of generator 104, scaling the ratio by a droop percentage, and multiplying the scaled ratio by a voltage set point for generator 104.

In the exemplary embodiment, the method further includes controlling 306 an excitation signal to generator 104 based at least in part on the simulated droop compensation voltage using voltage regulator 102. In some embodiments, controlling the excitation signal includes tuning voltage gains of a voltage controller included in voltage regulator 102 and applying the simulated droop compensation voltage to generator 104. In other embodiments, controlling the excitation signal may include inducing generator 104 to share reactive power proportionately with at least one other generator coupled in parallel to generator 104 in system 100. In yet other embodiments, controlling the excitation signal may include protecting generator 104 from exceeding a voltage set point.

The exemplary embodiments described herein facilitate creating a simulative reactive load mode in a voltage regulator of a generator in a parallel power generation system. More particularly, the embodiments described herein facilitate using a voltage regulator associated with a generator to simulate a reactive load for tuning a power factor, voltage droop, and/or other various properties of a parallel generator power generation system. Moreover, the embodiments described herein facilitate reducing costs associated with technician labor and costly reactive load rentals.

Exemplary embodiments of a voltage regulator and methods for simulating reactive power in parallel power generation systems are described above in detail. The size ranges disclosed herein include all the sub-ranges therebetween. The methods and systems are not limited to the specific embodiments described herein, but rather, components of systems and/or steps of the methods may be utilized independently and separately from other components and/or steps described herein. For example, the methods may also be used in combination with other manufacturing systems and methods, and are not limited to practice with only the systems and methods as described herein. Rather, the exemplary embodiment can be implemented and utilized in connection with many other electrical component applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A voltage regulator for tuning a reactive droop compensation of a generator in a parallel power generation system, said voltage regulator comprising a processor configured to:
    receive a measurement of an output voltage of the generator from a voltage sensor and a measurement of an output current of the generator from a current sensor;
    calculate apparent power output by the generator based on the measurements of output voltage and output current;
    calculate reactive power based at least partially on the calculated apparent power;
    compute a simulated droop compensation voltage for the generator based on the calculated reactive power; and
    generate an excitation signal to drive excitation current into a generator exciter for driving the generator based at least in part on the simulated droop compensation voltage.

2. The voltage regulator of claim 1, wherein said voltage regulator comprises a switching device configured to switch said voltage regulator to a simulated reactive load mode.

3. The voltage regulator of claim 1, wherein to compute a simulated droop compensation voltage, said voltage regulator further configured to:

receive a desired power factor input by a user;
compute reactive power using the desired power factor;
compute a ratio of the reactive power and rated machine parameters of the generator;
scale the ratio by a droop percentage; and
multiply the scaled ratio by a voltage set point for the generator.

4. The voltage regulator of claim 1, wherein to control an excitation signal to the generator, said voltage regulator further configured to:
tune voltage gains of a voltage controller included in said voltage regulator; and
apply the simulated droop compensation voltage to the generator.

5. The voltage regulator of claim 1, wherein to control an excitation signal to the generator, said voltage regulator further configured to share reactive power proportionately with at least one other generator coupled in parallel to the generator.

6. The voltage regulator of claim 1, wherein to control an excitation signal to the generator, said voltage regulator further configured to protect the generator from exceeding a voltage set point.

7. The voltage regulator of claim 1, comprising an analog input for voltage set point control by a user.

8. The voltage regulator of claim 1, wherein during operation of the power generation system, said voltage regulator further configured to
regulate the generator reactive power in accordance with the simulated droop compensation voltage.

9. A computer-implemented method of tuning a reactive droop compensation of a generator in a parallel power generation system, said method comprising:
applying, by a processor, a resistive load bank to the generator;
receiving, by the processor, a measurement of an output voltage of the generator from a voltage sensor and a measurement of an output current of the generator from a current sensor;
calculating, by the processor, apparent power output by the generator based on the measurements of output voltage and output current;
calculating, by the processor, reactive power based at least partially on the calculated apparent power;
computing, by the processor, a simulated droop compensation voltage for the generator using a voltage regulator associated with the generator based on the calculated reactive power; and
generating, by the processor, an excitation signal to drive excitation current into a generator exciter for driving the generator based at least in part on the simulated droop compensation voltage using the voltage regulator.

10. The method of claim 9, further comprising switching the voltage regulator to a simulated reactive load mode.

11. The method of claim 9, wherein computing a simulated droop compensation voltage comprises:
inputting a desired power factor into the voltage regulator;
computing reactive power using the desired power factor;
computing a ratio of the reactive power and rated machine parameters of the generator;
scaling the ratio by a droop percentage; and
multiplying the scaled ratio by a voltage set point for the generator.

12. The method of claim 9, wherein controlling an excitation signal to the generator further comprises:
tuning voltage gains of a voltage controller included in the voltage regulator; and
applying the simulated droop compensation voltage to the generator.

13. The method of claim 9, wherein controlling an excitation signal to the generator further comprises inducing the generator to share reactive power proportionately with at least one other paralleled generator in the power generation system.

14. The method of claim 9, wherein controlling an excitation signal to the generator further comprises protecting the generator from exceeding a voltage set point.

15. A parallel power generation system comprising:
a first generator configured to produce an electrical output to drive a load; and
a voltage regulator for tuning a reactive droop compensation of said first generator, said voltage regulator configured to:
receive a measurement of an output voltage of the generator from a voltage sensor and a measurement of an output current of the generator from a current sensor;
calculate apparent power output by the generator based on the measurements of output voltage and output current;
calculate reactive power based at least partially on the calculated apparent power;
compute a simulated droop compensation voltage for said first generator based on the calculated reactive power; and
generate an excitation signal to drive excitation current into a generator exciter for driving said first generator based at least in part on the simulated droop compensation voltage.

16. The system of claim 15, wherein said voltage regulator comprises a switching device configured to switch said voltage regulator to a simulated reactive load mode.

17. The system of claim 15, wherein to compute a simulated droop compensation voltage, said voltage regulator further configured to:
receive a desired power factor input by a user;
compute reactive power using the desired power factor;
compute a ratio of the reactive power and rated machine parameters of said first generator;
scale the ratio by a droop percentage; and
multiply the scaled ratio by a voltage set point for said first generator.

18. The system of claim 15, wherein to control an excitation signal to said first generator, said voltage regulator further configured to:
tune voltage gains of a voltage controller included in said voltage regulator; and
apply the simulated droop compensation voltage to said first generator.

19. The system of claim 15, further comprising at least one second generator coupled in parallel to said first generator, wherein said voltage regulator is configured to induce said first generator to share reactive power proportionately with said at least one second generator.

20. The system of claim 15, wherein during operation, said voltage regulator further configured to
regulate said first generator reactive power in accordance with the simulated droop compensation voltage.

* * * * *